United States Patent
Cochran

(10) Patent No.: US 10,723,204 B2
(45) Date of Patent: Jul. 28, 2020

(54) VEHICULAR AIR CONDITIONING SYSTEM

(71) Applicant: DENSO International America, Inc., Southfield, MI (US)

(72) Inventor: William Cochran, Fullerton, CA (US)

(73) Assignee: DENSO International America, Inc., Southfield, MI (US)

(*) Notice: Subject to any disclaimer, the term of this patent is extended or adjusted under 35 U.S.C. 154(b) by 144 days.

(21) Appl. No.: 15/881,226

(22) Filed: Jan. 26, 2018

(65) Prior Publication Data

US 2019/0232760 A1 Aug. 1, 2019

(51) Int. Cl.
*B60H 1/32* (2006.01)
*B60H 1/00* (2006.01)

(52) U.S. Cl.
CPC ....... *B60H 1/3233* (2013.01); *B60H 1/00521* (2013.01); *B60H 1/00564* (2013.01)

(58) Field of Classification Search
CPC ............. B60H 1/3233; B60H 1/00564; B60H 1/00521
See application file for complete search history.

(56) References Cited

U.S. PATENT DOCUMENTS

| | | | |
|---|---|---|---|
| 3,999,599 A | 12/1976 | Zuege | |
| 4,533,673 A | 8/1985 | Nakane | |
| 5,221,231 A | 6/1993 | Jeckel | |
| 5,755,107 A | 5/1998 | Shirota et al. | |
| 6,070,425 A | 6/2000 | Ito et al. | |
| 6,196,303 B1 | 3/2001 | Hepper | |
| 6,708,516 B2 | 3/2004 | Nakagawa et al. | |
| 7,036,333 B2* | 5/2006 | Schurig | B60H 1/00514 454/147 |
| 7,284,388 B2* | 10/2007 | Yoshida | F28F 17/005 62/285 |
| 7,392,663 B2* | 7/2008 | Kang | B60H 1/3233 454/121 |
| 7,407,001 B2 | 8/2008 | Newman et al. | |
| 7,721,565 B2* | 5/2010 | Williams | F24F 13/222 62/285 |
| 7,752,863 B2 | 7/2010 | Kim et al. | |
| 8,037,707 B2 | 10/2011 | Lee et al. | |
| 8,151,591 B2 | 4/2012 | Nakamura et al. | |
| 8,561,420 B2* | 10/2013 | Kakizaki | B60H 1/3227 62/279 |

(Continued)

FOREIGN PATENT DOCUMENTS

| | | |
|---|---|---|
| JP | 2010158948 A | 7/2010 |
| JP | 2011152850 A | 8/2011 |

(Continued)

*Primary Examiner* — Frantz F Jules
*Assistant Examiner* — Lionel Nouketcha
(74) *Attorney, Agent, or Firm* — Harness, Dickey & Pierce, P.L.C.

(57) ABSTRACT

An evaporator assembly, including an evaporator housing having a drain channel, and a joint duct connected to the evaporator housing to receive air from a blower, and to direct the air to the evaporator housing. The joint duct further includes an extension piece and an extension part shelf. The extension part shelf extends from the extension piece into the evaporator housing, and blocks the drain channel from the air flowing from the joint duct and into the evaporator housing.

18 Claims, 3 Drawing Sheets

(56) References Cited

U.S. PATENT DOCUMENTS

| | | | |
|---|---|---|---|
| 8,997,837 B2* | 4/2015 | Kakizaki | B60H 1/00064 |
| | | | 165/42 |
| 9,958,195 B2* | 5/2018 | Mazzocco | F25D 21/14 |
| 2006/0236662 A1 | 10/2006 | Currie et al. | |
| 2007/0039713 A1 | 2/2007 | Suzuki | |
| 2013/0074528 A1 | 3/2013 | Graaf et al. | |
| 2015/0245721 A1 | 9/2015 | Nugroho et al. | |
| 2018/0022192 A1* | 1/2018 | Maeda | B60H 1/3233 |
| | | | 62/243 |

FOREIGN PATENT DOCUMENTS

| | | |
|---|---|---|
| JP | 2014142080 A | 8/2014 |
| WO | WO-2009056454 A1 | 5/2009 |
| WO | WO-2010079741 A1 | 7/2010 |
| WO | WO-2011093052 A1 | 8/2011 |
| WO | WO-2013018005 A2 | 2/2013 |
| WO | WO-2013087820 A1 | 6/2013 |
| WO | WO-2014115662 A1 | 7/2014 |

\* cited by examiner

VEHICULAR AIR CONDITIONING SYSTEM

FIELD

The present disclosure relates to an air conditioning drainage system for a vehicle.

BACKGROUND

In an Air Conditioning (AC) system, such as those used on a vehicle, an evaporator is used to cool the warm air inside of a vehicle. The evaporator works when cold, low-pressure liquid refrigerant enters the evaporator. A blower fan directs warm air from either the interior of the vehicle or from outside the vehicle to the evaporator, where heat from warm air is absorbed by the evaporator. At the same time, humidity from the air condenses into droplets of liquid water, known as condensate, and form on the evaporator's surface. The condensate then drains through an evaporator drain to the outside of the vehicle.

Due to packaging requirements to fit the evaporator system within a confined space, the evaporator drain is located in the same main chamber where the warm air directed from the air blower flows through, which creates a high pressure region. Due to this high pressure, the condensed water backs up, and is not properly drained from the evaporator. This may reduce the effectiveness of the evaporator in cooling warm air, and increases the possibility for water leaks that may damage components surrounding the evaporator. An evaporator with improved drainage would therefore be desirable. The present disclosure provides for such an evaporator having numerous advantages and unexpected results as compared to the prior art, as explained in detail herein, and as one skilled in the art will recognize.

SUMMARY

This section provides a general summary of the disclosure, and is not a comprehensive disclosure of its full scope or all of its features.

An air conditioning system for a vehicle is provided. The air conditioning system includes an evaporator assembly, including an evaporator housing having a drain channel, and a joint duct connected to the evaporator housing to receive air from a blower, and to direct the air to the evaporator housing. The joint duct further includes an extension piece and an extension part shelf. The extension part shelf extends from the extension piece into the evaporator housing, and blocks the drain channel from the air flowing from the joint duct and into the evaporator housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
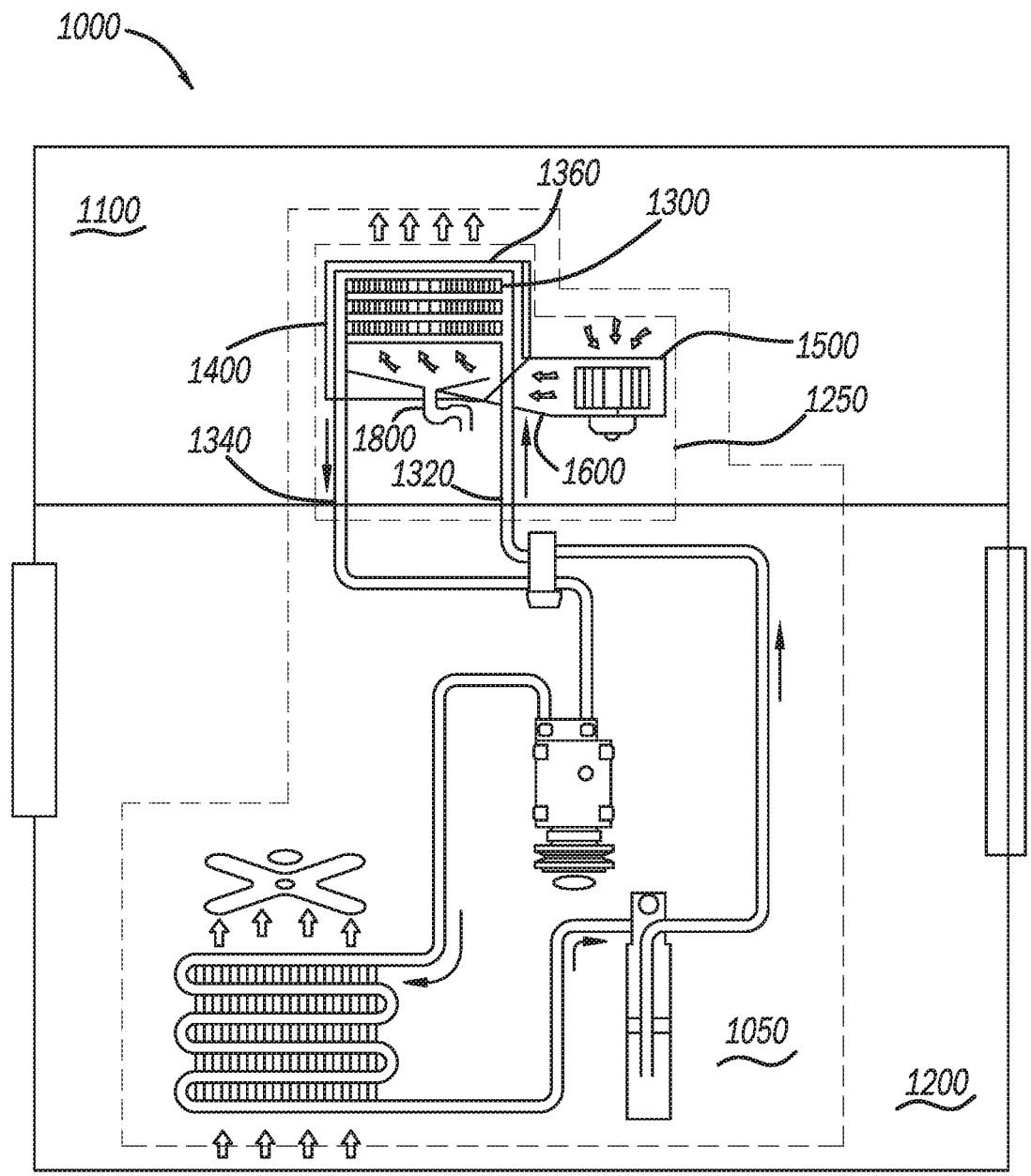
FIG. 1 is a top-down schematic drawing of an air conditioning system according to the present disclosure.

FIG. 1 is a top-down schematic drawing of an air conditioning system according to the present disclosure. In FIG. 1, a vehicle 1000 includes an Air Conditioning (AC) system 1050. The AC system 1050 may be placed within a passenger compartment 1100 and an engine compartment 1200 of the vehicle. Many components of the AC system 1050, such as a condenser (not shown) and a compressor (not shown) may be placed within the engine compartment 1200. However, an evaporator assembly 1250 included within the AC system 1050 is located in the passenger compartment 1100, typically under the dashboard (not shown). The evaporator assembly 1250 includes an evaporator 1300 (also known as an evaporator core) that is encapsulated in an evaporator case 1400 (also known as an evaporator housing), a blower 1500, and a joint duct 1600 connecting the evaporator case with the blower 1500. The evaporator 1300 has an in-flow pipe 1320 where a refrigerant flows into the evaporator 1300 from other components of the AC system 1050, and an outflow pipe 1340, where the refrigerant flows out of the evaporator 1300 back to the other components of the AC system 1050. The evaporator case 1400 is connected to a blower 1500 via a joint duct 1600, and has a drain 1800.

In operation, the blower 1500 draws either air outside of the vehicle 1000 or air that has been recirculated from the passenger compartment 1100 into the evaporator assembly 1250. This warm air passes from the blower 1500, through the joint duct 1600, and through the evaporator 1300 within the evaporator case 1400, where the air is cooled by the refrigerant passing within the evaporator 1300 from the in-flow pipe 1320 to the outflow pipe 1340. As the air is cooled, condensate forms on the evaporator 1300, where it gathers and eventually flows out of the AC system 1050 and outside of the vehicle via the drain 1800. The cooled air then flows across the evaporator 1300, out of the evaporator assembly 1250, and into the passenger compartment 1100 through a vent 1360.

Figure 2:
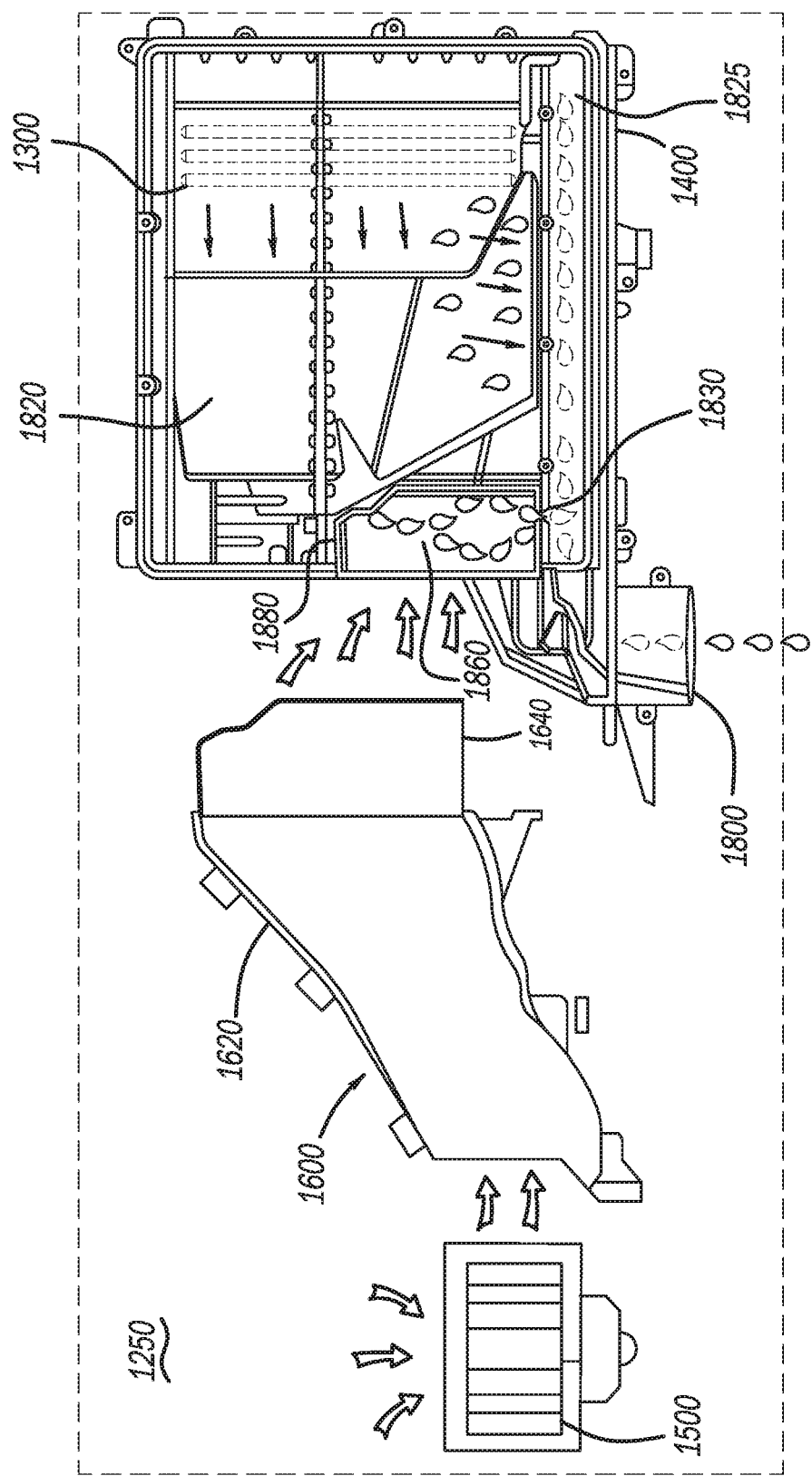
FIG. 2 is a top-down schematic drawing of separated pieces of an evaporator assembly according to the present disclosure.

FIG. 2 is a top-down schematic drawing of separated pieces of an evaporator assembly 1250 according to the present disclosure. In FIG. 2, joint duct 1600 includes an extension piece 1620 that connects the blower 1500 with the evaporator case 1400. The joint duct 1600 also includes an extension part shelf 1640 that extends from the extension piece 1620 towards the evaporator case 1400. As will be seen below, when the joint duct 1600 is assembled with the evaporator case 1400, the extension piece 1620 extends into the evaporator case 1400.

Referring to FIG. 2, the evaporator case 1400 further has a collecting pan 1820 where condensate formed on the evaporator 1300 gathers. On one end of the collecting pan 1820 is a rib 1825, where the condensate drains from the collecting pan 1820 to the rib 1825. To allow the condensate to flow more easily to the rib 1825, the collecting pan 1820 may be angled and have an incline that lowers towards the rib 1825 on the one end of the collecting pan 1820. From here the condensate then drains behind the rib 1825, where it reaches a slit 1830 and flows onto a drain channel 1860.

From the drain channel 1860 the condensate then flows to the drain 1800. The evaporator case 1400 also has an extension part shelf receiver 1880 that receives the extension part shelf 1640 when the pieces of the evaporator assembly are assembled.

In operation, air from the outside of the vehicle 1000 or air recirculated from the passenger compartment 1100 in the vehicle 1000 is drawn into the blower 1500. The blower 1500 then ejects air from the blower 1500 through the extension piece 1620 and into the evaporator case 1400 where the evaporator 1300 is located. That is, air flows from the blower 1500 as the main airflow through the joint duct 1600 that includes the extension piece 1620 and the extension part shelf 1640, and into the evaporator case 1400. The rapid rate of flow by the air through the extension piece 1620 and the evaporator case 1400 that includes the evaporator 1300 creates a high pressure zone in its flow path. Normally, the air flow within the high pressure zone pushes the condensate formed to gather at an end of the evaporator opposite an end where the air enters the evaporator case 1400 from the extension piece 1620 in the joint duct 1600. This may inhibit the flow of the condensate out of the evaporator case 1400. As a result, backup of the condensate within the evaporator case 1400 may occur, leading to leaks that may damage other components surrounding the evaporator assembly 1250.

As will be seen in more detail below, the evaporator assembly 1250 as presented by the present disclosure reduces the risk of leaks from backup of the condensate caused by the air flow in the high pressure zone. That is, the extension of the extension part shelf 1640 from the extension piece 1620 to the extension part shelf receiver 1880 blocks the main airflow from entering an area (to be described in further detail below) where the drain channel 1860 is located. In other words, the extension part shelf 1640 shields (i.e., is shaped to close off) the drain channel 1860 from the high pressure zone created by the main airflow through the evaporator. The shielding creates a low pressure zone in the area shielded by the extension part shelf 1640 (as will be explained in more detail below), which includes the drain channel 1860, relative to the high pressure zone, and where condensate drains through to the drain 1800, and to the outside of the vehicle 1000. Compared to existing evaporator assemblies, the creation of the low pressure zone by the extension part shelf 1640 allows the condensate to flow through the drain channel 1860 more quickly, thus avoiding the problems faced by existing evaporator assemblies described above.

Figure 3:
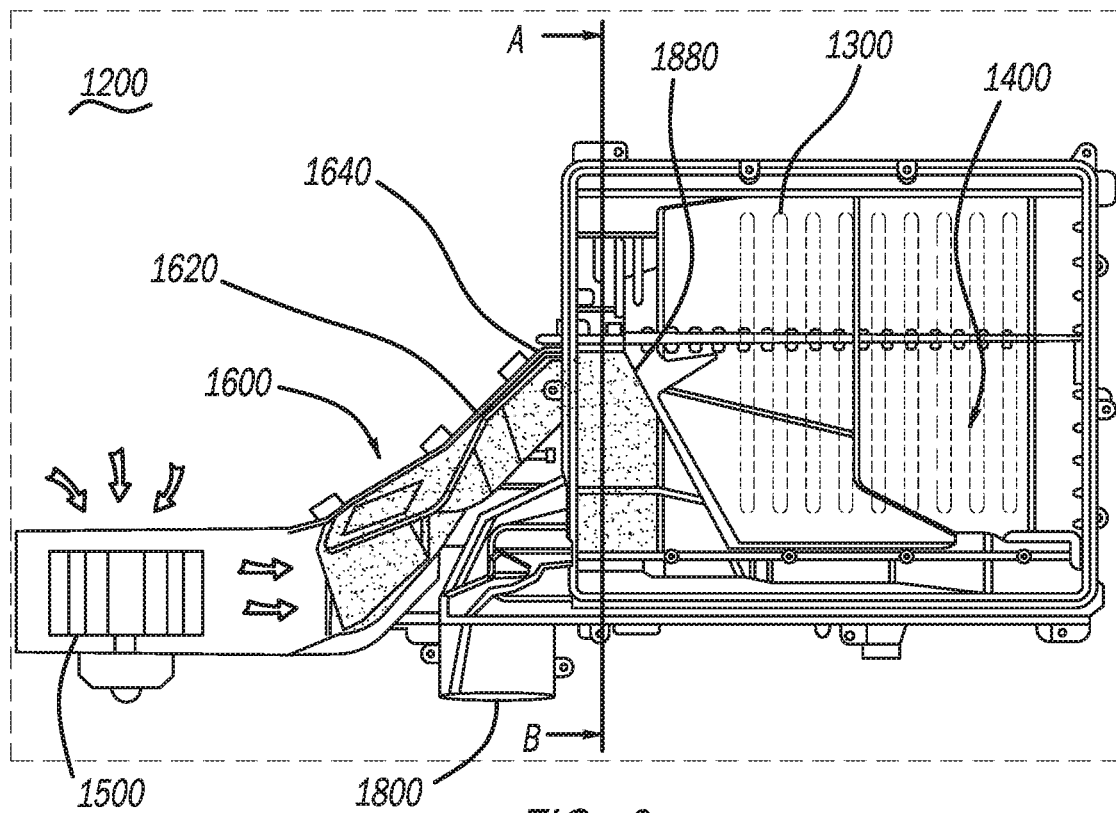
FIG. 3 is a top-down schematic drawing of an evaporator assembly with connected pieces according to the present disclosure.

FIG. 3 is a top-down schematic drawing of an evaporator assembly 1250 with connected pieces according to the present disclosure. In FIG. 3, it is shown that the blower 1500 is connected to the evaporator case 1400 via the joint duct 1600. Here, the extension part shelf 1640 of the joint duct 1600 extends into the extension part shelf receiver 1880 of the evaporator case 1400.

Figure 4:
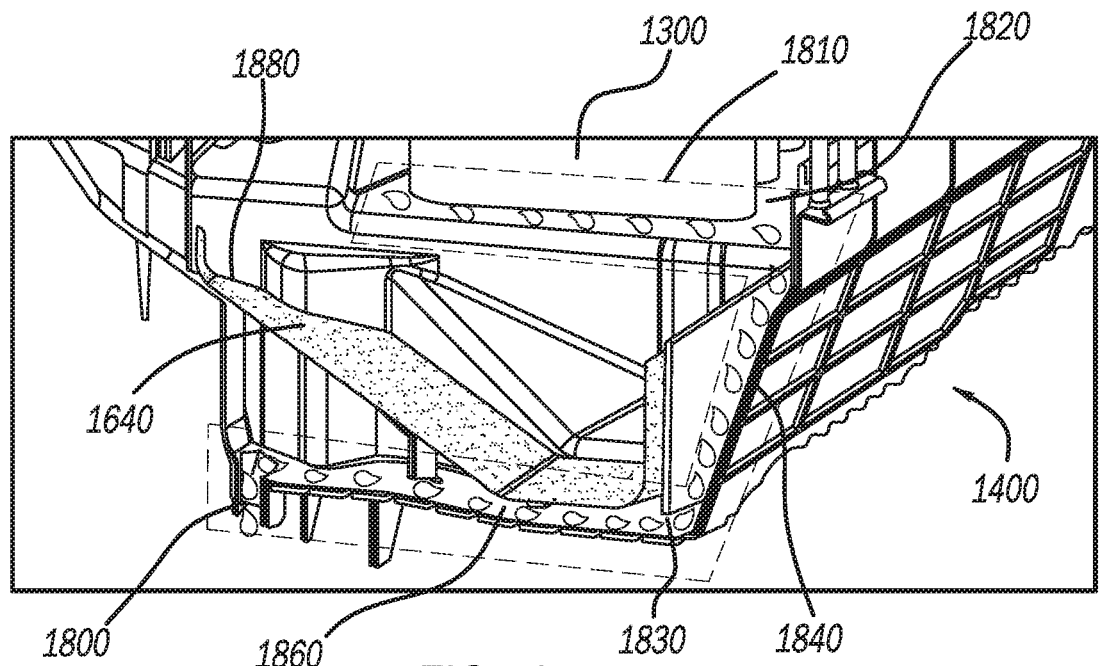
FIG. 4 is a close up, three-dimensional diagonal cutaway drawing of the evaporator case according to the present disclosure.

FIG. 4 is a close up, three-dimensional diagonal cutaway drawing of the evaporator case 1400 according to the present disclosure. Here, the cutaway is made along the "A-B" segment as shown in FIG. 3. In detail, the evaporator case 1400, where evaporator 1300 is placed, includes a drainage area 1810 (shown by the dotted line) that includes a collecting pan 1820 located underneath the evaporator 1300, drain wall 1840 underneath the collecting pan 1820 and behind the rib 1825 (not shown here), and drain channel 1860 at a bottom end of the drain wall 1840 opposite to a top end of the drain wall 1840 closer to the collecting pan 1820.

As discussed previously, the collecting pan 1820 may be angled (i.e., have an incline that lowers) towards the rib 1825 on one end of the collecting pan 1820 closer to the rib 1825 to allow the condensate to flow more easily toward the rib 1825 on the one end of the collecting pan 1820. Also, the drain wall 1840 is angled so that once the condensate drains behind the rib 1825, the condensate continue flowing down the drain wall 1840 toward the slit 1830. When the evaporator assembly 1250 is assembled, the extension part shelf 1640 extends into the evaporator case 1400 and attaches to the extension part shelf receiver 1880 that is part of the evaporator case 1400.

In operation, the extension part shelf 1640 separates, (i.e., is shaped to close off) at least part of the drainage area 1810, more particularly, the drain channel 1860 from the area where air flows into the evaporator case 1400. As the air flows through and is cooled, condensate forms on the evaporator 1300. The condensate then gathers and flows from the evaporator 1300, where it drops onto the collecting pan 1820 beneath the evaporator 1300. The condensate then flows from the collecting pan 1820, down the drain wall 1840, through the slit 1830, and onto the drain channel 1860, where the condensate then flows out of the vehicle through the drain 1800.

That is, as shown in FIG. 4, and as described previously, a high pressure zone is created from where the air flows from the blower 1500, through the joint duct 1600, and into the evaporator case 1400. In existing evaporator assemblies, without the extension part shelf 1640 extending into the evaporator case 1400, the high pressure zone created keeps the condensate from properly draining, as the air flow pushes the condensate away from the drain 1800.

In contrast, when the evaporator assembly 1250 is assembled, the extension part shelf 1640 extends into the evaporator case 1400 and separates (i.e., closes off or blocks) the area surrounding the evaporator 1300, where air from the blower 1500 flows through within the evaporator case 1400 and creates the high pressure zone, from the drain channel 1860. The separation by the extension part shelf 1640 creates a low pressure zone within the drain channel 1860, which allows the condensate to more easily flow through and exit the evaporator assembly 1250 through the drain 1800. In other words, the high pressure that is created when the blower 1500 blows air through the evaporator case 1400 does not affect the flow of the condensate through the drain channel 1860 and the drain 1800 to the outside.

In other words, in comparison to the high pressure zone created by the air flowing in the main airflow path in the area surrounding the evaporator 1300, the blocking of the airflow into the drain channel 1860 by extension part shelf 1640 creates a pocket of low pressure zone in the drain channel 1860 by blocking the main airflow path and creating a pocket for the water to flow. Thus, with the extension part shelf 1640 preventing the backing up of the condensate in the drain channel 1860 by separating the high pressure zone created by the main airflow from the low pressure zone within the drain channel 1860, condensate flows more freely out of the vehicle through the drain channel 1860.

Therefore, the above describes in detail the AC system 1050 for the vehicle 1000. The AC system 1050 includes the evaporator assembly 1250, including the evaporator case 1400 (i.e., housing) having a drain channel 1860, the joint duct 1600 connected to the evaporator case 1400, and the blower 1500 connected to the joint duct 1600. The blower 1500 directing air through the joint duct 1600 and into the evaporator case 1400.

In other words, the joint duct 1600 is connected to the evaporator case 1400 to receive air from the blower 1500, and to direct the air to the evaporator 1300.

The joint duct 1600 further includes the extension piece 1620 and the extension part shelf 1640, the extension part shelf 1640 extending from the extension piece 1620 into the evaporator case 1400, and the extension part shelf 1640 shielding the drain channel 1860 from the air flowing from the joint duct 1600 and into the evaporator case 1400. Further, the extension part shelf 1640 creates a low pressure zone where the drain channel 1860 is located, relative to a high pressure zone separated by the extension part shelf 1640, where the air flows through the joint duct 1600 and the evaporator case 1400 separately from the drain channel 1860.

In more detail, the AC system 1050 includes the evaporator 1300, and the evaporator case 1400 encapsulating the evaporator 1300. The evaporator case 1400 has the collecting pan 1820 where the condensate that flows from the evaporator 1300 gathers.

The AC system 1050 also includes the joint duct 1600 connected to the evaporator case 1400. The joint duct 1600 has the extension piece 1620 connected to an extension part shelf 1640. The AC system 1050 further has the blower 1500 connected to the joint duct 1600. The blower 1500 directs air from either the outside of the vehicle 1000 or the passenger compartment 1100 within the vehicle 1000 through the joint duct 1600 and into the evaporator case 1400.

The AC system 1050 also includes the drainage area 1810, where the condensate flows out of the collecting pan 1820. The drainage area 1810 includes the drain wall 1840 through which the condensate flows out of the collecting pan 1820, the drain channel 1860 connected to the drain wall 1840 for the condensate to flow from the drain wall 1840, and the drain 1800 connected to the drain channel 1860 for the condensate to flow through the drain 1800 and outside of the vehicle 1000, the extension part shelf 1640 blocks the air directed by the blower 1500 from entering the drainage area 1810.

It is noted that the location of the extension part shelf 1640 may vary. For example, instead of extending from the extension piece 1620 of the joint duct 1600, the extension part shelf 1640 may instead be part of the evaporator case 1400 and extend into the extension piece 1620 of the joint duct 1600, so long the extension part shelf 1640 is able to block the high pressure air directed by the blower 1500 from entering the drainage area 1810.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An evaporator assembly, comprising:
   an evaporator housing having a drain channel; and
   a joint duct connected to the evaporator housing to receive
      air from a blower, and to direct the air to the evaporator housing, the joint duct further includes an extension piece and an extension part shelf, the extension part shelf:
- extending from the extension piece into the evaporator housing;
- extending over the drain channel to direct airflow from the joint duct over the drain channel and into the evaporator housing; and
- blocking the drain channel from the air flowing from the joint duct and into the evaporator housing.

2. The evaporator assembly of claim 1, wherein the extension part shelf separates the drain channel from the rest of the evaporator housing where the air directed from the blower flows through via the joint duct.

3. The evaporator assembly of claim 2, wherein the extension part shelf creates a low pressure zone where the drain channel is located, relative to a high pressure zone separated by the extension part shelf, where the air flows through the joint duct and the evaporator housing separately from the drain channel.

4. The evaporator assembly of claim 1, wherein the evaporator housing further includes an extension part shelf receiver into which the extension part shelf extends from the extension piece.

5. The evaporator assembly of claim 1, wherein the evaporator housing further includes a collecting pan where condensate from an evaporator gathers.

6. The evaporator assembly of claim 5, wherein the evaporator housing further includes a rib on an end of the collecting pan towards which the condensate drains behind.

7. The evaporator assembly of claim 6, wherein the evaporator housing further includes a drain wall that receives the condensate that drains behind the rib, the condensate flowing down the drain wall towards a slit.

8. The evaporator assembly of claim 7, further comprising a drain, wherein the slit provides access for the condensate to flow through to the drain channel from the drain wall and exit the evaporator housing through the drain.

9. The evaporator assembly of claim 7, wherein the drain wall is angled so that the condensate draining behind the rib is directed towards the slit.

10. The evaporator assembly of claim 6, wherein the collecting pan is angled so that the condensate gathered at the collecting pan flows toward the rib.

11. The evaporator assembly of claim 1, wherein the extension part shelf is shaped to close off the drain channel from a rest of the evaporator housing where the air is directed into.

12. An evaporator assembly, comprising:
an evaporator housing having a drain channel;
a joint duct connected to the evaporator housing; and
a blower connected to the joint duct, the blower directing air through the joint duct and into the evaporator housing, wherein
the joint duct further includes an extension piece and an extension part shelf, the extension part shelf extends from the extension piece into the evaporator housing,
the extension part shelf extends over the drain channel to direct airflow from the joint duct over the drain channel and into the evaporator housing,
the extension part shelf shields the drain channel from the air flowing from the joint duct and into the evaporator housing, and
the extension part shelf creates a low pressure zone where the drain channel is located, relative to a high pressure zone separated by the extension part shelf, where the air flows through the joint duct and the evaporator housing separately from the drain channel.

13. The evaporator assembly of claim 12, wherein the extension part shelf separates the drain channel from the rest of the evaporator housing where the air directed from the blower flows through via the joint duct.

14. The evaporator assembly of claim 12, wherein the evaporator housing further includes an extension part shelf receiver into which the extension part shelf extends from the extension piece.

15. The evaporator assembly of claim 12, wherein the evaporator housing further includes a collecting pan where condensate from an evaporator gathers.

16. The evaporator assembly of claim 12, wherein the extension part shelf is shaped to close off the drain channel from a rest of the evaporator housing where the air is directed into.

17. An air conditioning system for a vehicle, comprising:
an evaporator;
an evaporator case encapsulating the evaporator, the evaporator case having a collecting pan where a condensate that flows from the evaporator gathers;
a joint duct connected to the evaporator case, the joint duct having an extension piece connected to an extension part shelf;
a blower connected to the joint duct, the blower directing air through the joint duct into the evaporator case; and
a drainage area where the condensate flows out of the collecting pan, the drainage area including:
a drain wall through which the condensate flows out of the collecting pan,
a drain channel connected to the drain wall for the condensate to flow from the drain wall, and
a drain connected to the drain channel for the condensate to flow through the drain and outside of the vehicle,
wherein the extension part shelf extends over the drain channel to direct airflow from the joint duct over the drain channel and into the evaporator case; and
wherein the extension part shelf blocks the air directed by the blower from entering the drainage area.

18. The air conditioning system according to claim 17, wherein the evaporator case further includes a receiver for receiving the joint duct shelf, when the joint duct is connected to the evaporator case.

* * * * *